United States Patent
Fussell et al.

(10) Patent No.: US 7,060,919 B2
(45) Date of Patent: Jun. 13, 2006

(54) CONTACT FOR A VEHICLE HORN CIRCUIT

(75) Inventors: William D. Fussell, Houston, TX (US); Randall L. Wingenroth, Cypress, TX (US); Roger L. Bell, Cypress, TX (US); Jay B. Stotts, Houston, TX (US)

(73) Assignee: Mitsubishi Caterpillar Forklift America, Inc., Houston, TX (US)

( * ) Notice: Subject to any disclaimer, the term of this patent is extended or adjusted under 35 U.S.C. 154(b) by 0 days.

(21) Appl. No.: 10/924,638

(22) Filed: Aug. 24, 2004

(65) Prior Publication Data

US 2006/0042917 A1    Mar. 2, 2006

(51) Int. Cl.
*H01H 9/00*    (2006.01)
(52) U.S. Cl. .................................................. 200/61.54
(58) Field of Classification Search ....... 200/61.54–56, 200/511, 61.27–38; 280/728.1, 2, 731
See application file for complete search history.

(56) References Cited

U.S. PATENT DOCUMENTS

| 1,988,796 | A |  | 1/1935 | Hueber et al. |
| 2,758,289 | A |  | 8/1956 | Schaber |
| 2,894,090 | A |  | 1/1959 | Timoff et al. |
| 3,127,191 | A |  | 3/1964 | Goldman |
| 4,055,375 | A |  | 10/1977 | Ogawa et al. |
| 4,063,789 | A |  | 12/1977 | Kreisl |
| 4,157,854 | A |  | 6/1979 | Beauch |
| 4,380,341 | A |  | 4/1983 | Waldschutz et al. |
| 4,516,001 | A |  | 5/1985 | West |
| 5,563,354 | A | * | 10/1996 | Kropp .................... 73/862.473 |
| 5,789,827 | A |  | 8/1998 | Rowley et al. |
| 6,491,319 | B1 | * | 12/2002 | Bonn ........................ 200/511 |
| 6,576,855 | B1 | * | 6/2003 | Levendis et al. ........... 200/339 |
| 6,595,306 | B1 | * | 7/2003 | Trego et al. ............... 180/19.2 |
| 2002/0041087 | A1 |  | 4/2002 | Bonn |
| 2005/0011736 | A1 | * | 1/2005 | Mori et al. |

FOREIGN PATENT DOCUMENTS

| DE | 41 31 533 A1 | 3/1993 |
| FR | 644.660 | 10/1928 |
| FR | 2 579 011 A3 | 9/1986 |

OTHER PUBLICATIONS

European Search Report dated Nov. 24, 2005.
National Electric Carbon Products Brochure; Dated Apr. 12, 2004; (11 pages).

* cited by examiner

*Primary Examiner*—Elvin J. Enad
*Assistant Examiner*—M. Fishman
(74) *Attorney, Agent, or Firm*—Osha Liang LLP

(57) ABSTRACT

A horn circuit for a vehicle includes a steering wheel, a prong extending from a base, and a carbon-based contact disposed on the prong and in electrical contact with the steering wheel. A method of manufacturing a vehicular horn system includes connecting a prong to a base, connecting a steering wheel to a steering column that extends through the base, and positioning a carbon-based contact at an end of the prong to be in electrical contact with the steering wheel.

19 Claims, 4 Drawing Sheets

CONTACT FOR A VEHICLE HORN CIRCUIT

BACKGROUND OF INVENTION

1. Field of the Invention

The invention relates generally to components of an electrical circuit such as those used with a vehicle horn. More specifically, the invention related to an electrical contact with improved wear and operating life characteristics.

2. Background Art

Horns are used in all types of vehicles. A horn is particularly important in a forklift truck because of the significant dangers surrounding the use of forklift trucks. For example, many forklift trucks have structures that obscure the driver's view, making it difficult for the driver to see pedestrians in the path of the forklift truck. In addition, many forklift trucks are operated in a warehouse, where a pedestrian could walk around a blind corner and into the path of a forklift truck. In such a case, neither the pedestrian nor the forklift truck operator is able to see the other in time to prevent an accident. Additionally, forklift trucks are often used to carry heavy loads that could fall and cause severe injuries in an accident.

A horn is an important safety device on a forklift truck because it enables the operator to warn people nearby to stay clear of the forklift truck. Because of the important safety aspects, the horn in a forklift truck is used much more often than a horn in a typical passenger car. In many cases, the horn on a forklift truck is used more than one million times during the life of the forklift truck.

Most vehicle horns, including horns on forklift trucks, are activated by depressing the center of a steering wheel. When the center section of the steering wheel is depressed, it makes electrical contact to complete the horn circuit. The primary difficulty in completing a horn circuit is that it must be done in a way that will still enable the rotation of the steering wheel to steer the vehicle.

FIG. 1 shows a steering wheel assembly 100 that includes a steering wheel 101 connected to a steering column 105. The steering column 105 connects to the steering wheel 101 just above a base or a control assembly 107. The steering wheel 101 includes a center section 104 that may be depressed to energize a horn circuit (not shown).

FIG. 2 is an view of the underside of the steering wheel 101. The steering wheel 101 includes a socket 204 for connecting to a steering column (e.g., column 105 in FIG. 1). The steering wheel 101 also includes a conductive portion 202. In some embodiments, the conductive portion 202 is attached to the underside of the steering wheel 101, and in other embodiments, the conductive portion 202 may be integral to the steering wheel 101.

FIG. 3 is a cross section of a steering wheel 101 with a conductive portion 202 located on the underside of the steering wheel 101. The steering wheel 101 is connected to a steering column 105. A control assembly 107 is positioned below the steering wheel 101. A conductive prong 301 extends from the control assembly 107, and the prong 301 is coupled to the control assembly 107 (e.g., with bolt 308 or other suitable means). The prong 301 extends to be in electrical contact with the conductive portion 202 on the steering wheel 101. As the steering wheel 101 rotates during the steering of the forklift truck (not shown), the prong 301 maintains electrical contact with the conductive portion 202.

In some embodiments, the conductive portion 202 is electrically connected to the center section 104 of the steering wheel 101. When the center section 104 is depressed, the circuit is closed, and an electrical connection is created between the conductive portion 202 and the steering column 105, by way of the center section 104 of the steering wheel 101. The base of the prong 301 is electrically connected to the horn circuit, and the steering column 105 is electrically connected to ground. Thus, by depressing the center section 104 of the steering wheel 101, the horn circuit is closed, and the horn will sound.

In the embodiment shown in FIG. 3, the prong 301 includes a protrusion 305 at the end of the prong 301 for making electrical contact with the conductive portion 202 of the steering wheel 101. It is noted that different shapes and geometries on the end of a prong may be used. The shape of the contact point on the prong in not important to the operation of the circuit.

Wear-induced horn failure is considered a normal limitation of a horn circuit lifespan and a worn contact is often the cause. Although the prior art approach of replacing, or providing an extension for, a worn prong or brush head is effective in most cases, in certain applications even short-lived vehicular horn failure may pose an unacceptably high safety hazard.

What is still needed, thus, is a horn circuit having a reduced risk of wear-induced failure.

SUMMARY OF INVENTION

In some embodiment the invention relates to a horn circuit for a vehicle that includes a steering wheel, a prong extending from a base, and a carbon-based contact disposed at an end of the prong and in electrical contact with the steering wheel. In at least one embodiment, the invention includes a first conductive portion disposed on an underside of the steering wheel and a second conductive portion disposed on the underside of the steering wheel, wherein the carbon-based contact is in electrical contact with the first conductive portion, and the second carbon-based contact is in electrical contact with the second conductive portion.

In other embodiments, the invention related to a method of manufacturing a vehicular horn system that includes connecting a prong to a base, connecting a steering wheel to a steering column that extends through the base, and positioning a carbon-based contact at an end of the prong to be in electrical contact with the steering wheel.

Other aspects and advantages of the invention will be apparent from the following description and the appended claims.

DETAILED DESCRIPTION

In one embodiment, the invention comprises a wear-resistant contact for a vehicular horn circuit. In particular, embodiments of the invention use carbon-based compounds as a contact for a vehicular horn circuit. In this disclosure, the term "carbon-based" is used to mean a compresses hardened carbon based solid.

In this disclosure, "connected" is used to mean joined or fastened together. It may mean that two or more things are directly connected to each other, and it may also include things that are indirectly connected. Thus, two things may be connected even when there is an intervening structure. "Electrically connected" is used to mean that electricity can flow between two things that are electrically connected. Other circuit elements may or may not be connected between items that are electrically connected, so long as electricity may flow between the electrically connected items.

Figure 4:
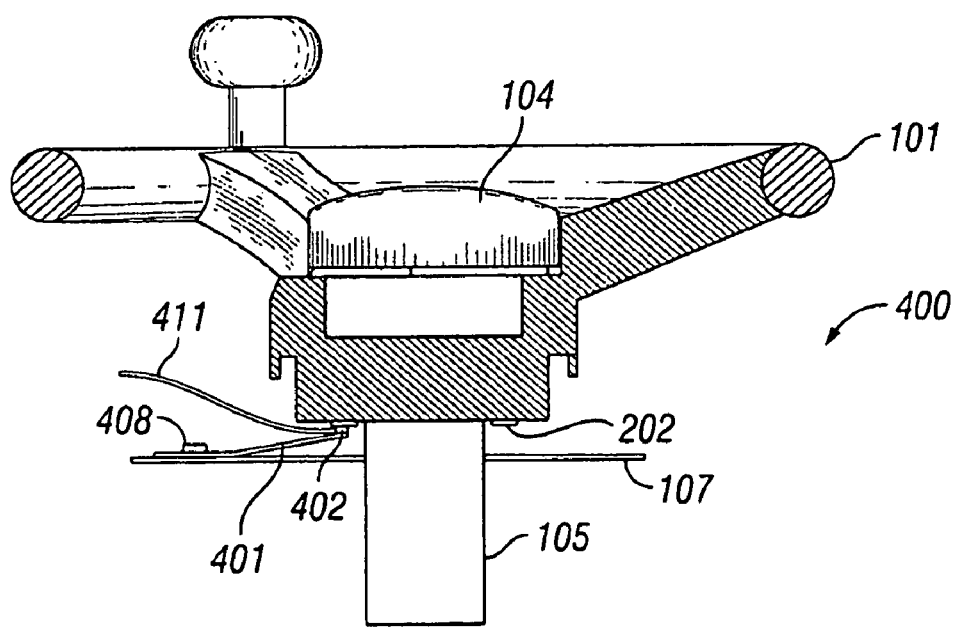
FIG. 4 shows a horn circuit in accordance with one embodiment of the invention.

FIG. 4 shows a partial horn circuit 400 in accordance with one embodiment of the invention. The steering wheel 101 is connected to a steering column 105 that is used to steer the vehicle (e.g., a forklift truck). In this embodiment, the horn circuit 400 is connected through the steering wheel 101 so that depressing the center section 104 of the steering wheel 101 will close the horn circuit.

The steering wheel 101 includes a conductive portion 202 located on the underside of the steering wheel 101. Electrical contact is made between the conductive portion 202 and a prong 401 that extends from the control assembly 107 to the steering wheel 101. A carbon-based contact 402 is positioned at the end of the prong 401 so that it makes electrical contact with the conductive portion 202 on the underside of the steering wheel 101. Because the conductive portion 202 in this embodiment encircles the bottom of the steering wheel 101, the carbon-based contact 402 will maintain electrical contact with the conductive portion 202, even when the steering wheel 101 is rotated to steer the vehicle.

Advantageously, the present inventors have discovered that by using a carbon-based contact, wear on the contact may be reduced. Suitably carbon-based contacts include, for example, a material such as CTI-22, typically compressed to a hardness in the 40–43 C range on the Rockwell scale.

The prong 401 is connected to the control assembly 107. It is noted that some embodiments may not include a control assembly. The prong 401 may be connected by any means known in the art. For example, FIG. 4 shows the prong 401 coupled to the control assembly 107 by a bolt 408. In other embodiments, the prong may be soldered, riveted, or connected by other means. A prong may be connected to any structure, generically called a "base," that will support the prong and hold it in place.

In some embodiments, the prong 401 is electrically connected in the horn circuit at the base of the prong 401. That is, the electrical current flows through the prong 401 and the carbon-based contact 402, when the horn circuit is closed. In other embodiments, such as the one shown in FIG. 4, a wire lead 411 is connected to the carbon-based contact 402, and the wire lead 411 forms part of the horn circuit. In still other embodiments, a wire lead 411 and the prong 401 are connected essentially in parallel so that both the prong 401 and the wire lead 411 form part of the horn circuit.

The partial circuit shown in FIG. 4 includes only one conductive portion 202 and prong 401. The horn circuit may be completed through the steering column 105, which may be grounded to the negative terminal of the battery (not shown) in the vehicle. In such an embodiment, the electrical current flows through the prong 401, through the carbon-based contact 402, and into the steering wheel 101 through the conductive portion 202. The current then flows through the center section 104 of the steering wheel 101, when depressed, and through the steering column 105. Note that the invention is not limited by the direction of electrical current flow. In some embodiments, the prong 401 may be electrically connected to the ground (i.e., negative terminal of the battery), and the steering column 105 is electrically connected to the positive terminal of a battery (not shown).

Figure 1:
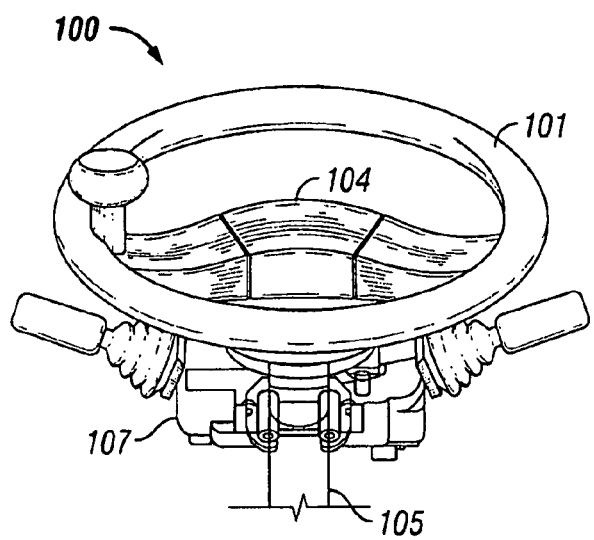
FIG. 1 shows a perspective view of a steering wheel.
Figure 2:
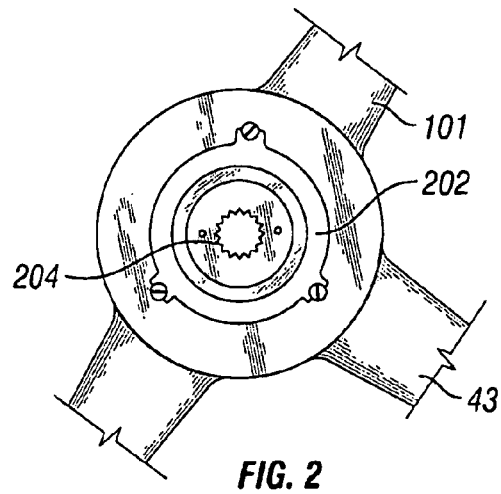
FIG. 2 shows a perspective view of the underside of a steering wheel.
Figure 5:
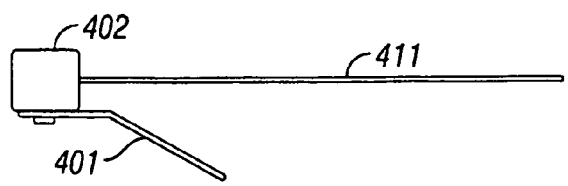
FIG. 5 shows a carbon-based contact in accordance with one embodiment of the invention.
Figure 3:
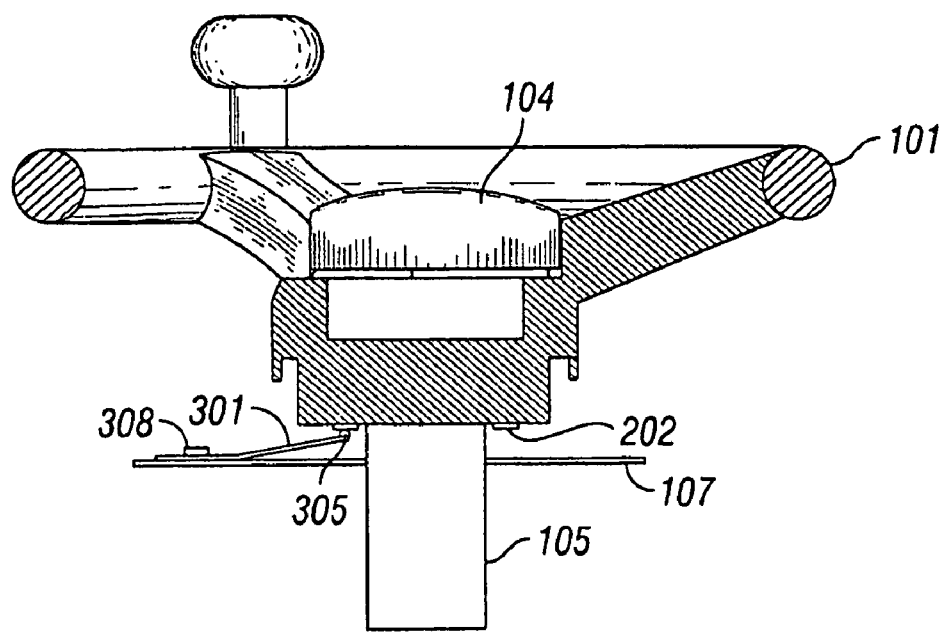
FIG. 3 shows a prior art horn circuit.

FIG. 5 shows an enlarged view of a prong 401 and a carbon-based contact 402, in accordance with one embodiment of the invention. The carbon-based contact 402 is positioned at the end of the prong 401. In some embodiments, the carbon-based contact 402 is connected to an electrical lead 411 that electrically connects the carbon-based contact 402 to the horn circuit. In other embodiments, the carbon-based contact 402 is coupled to the horn circuit by the prong 401. In some embodiments, the carbon-based contact 402 is substantially cylindrical. In other embodiments, a carbon-based contact 402 has a substantially flat upper surface for maximizing the surface area in contact with the conductive portion 202.

Figure 6:
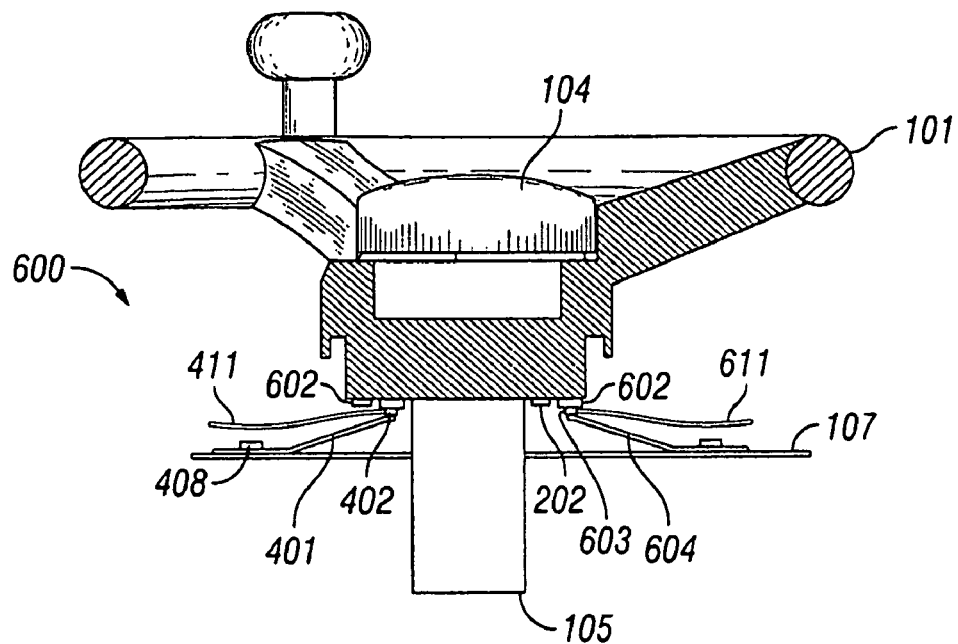
FIG. 6 shows a horn circuit in accordance with one embodiment of the invention.

FIG. 6 shows an embodiment of a partial horn circuit 600 in accordance with another embodiment of the invention. The steering wheel 101 includes a first conductive portion 202 and a second conductive portion 602. As with the embodiment shown in FIG. 4, the circuit 600 includes a prong 401 with a carbon-based contact 402 that is in electrical contact with the first conductive portion 202 on the underside of the steering wheel 101. The carbon based-contact 402 may include an electrical lead 411 that connects the carbon-based contact 402 to the remainder of the horn circuit 600.

The circuit also includes a second prong 604 that is coupled to the control assembly 107. The second prong 604 includes a second carbon-based contact 603 that is in electrical contact with the second conductive portion 602 on the underside of the steering wheel 101. Again, because the second conductive portion 602 is circular, the second carbon-based contact 603 remains in electrical contact with the second conductive portion 602 even when the steering wheel 101 is rotated.

In the embodiment shown in FIG. 6, the steering column 105 need not be grounded. The steering wheel 101 includes two conductive portions 202, 602 that are in electrical contact with two carbon-based contacts 402, 603 and prongs 401, 604, respectively. The positive connection may be made through one of the prong-contact-ring connections, and the negative (or ground) connection may be made through the other.

Figure 7A:
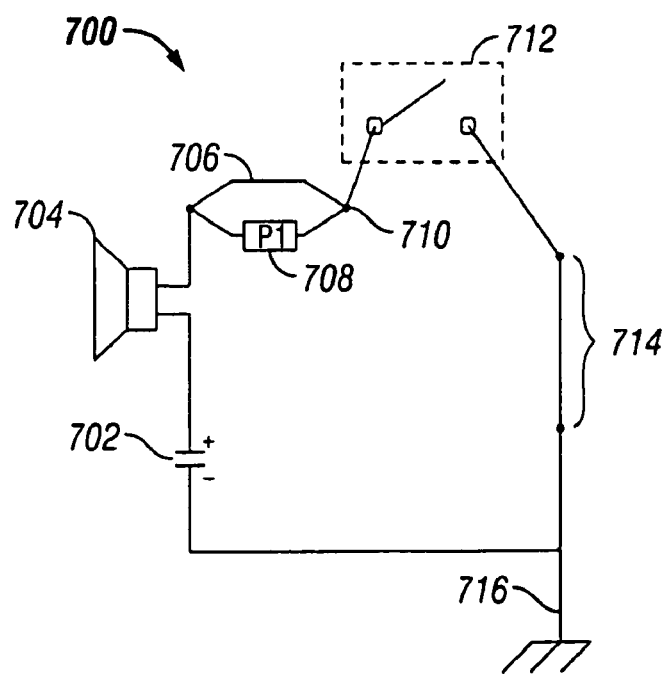
FIG. 7A shows a circuit diagram of a horn circuit in accordance with one embodiment of the invention.

FIG. 7A shows a circuit diagram for one embodiment of a horn circuit 700 in accordance with the invention. A horn 704 is electrically connected to a battery 702 that supplies electrical power to the horn 704. The horn 704 is also electrically connected to a switch 712 that enables activation of the horn 704. The switch 712 may be the center section of a steering wheel that will complete the circuit 700 when it is depressed.

A prong 708 is shown between the horn 704 and the switch 712. In some embodiments, the prong 708 is electrically connected to both the horn 704 and the switch 712. A carbon-based contact 710 is shown as a node between the prong 708 and the switch 712. As described above, in some embodiments, a carbon-based contact is positioned at the end of the prong and is in electrical contact with a conductive portion on the steering wheel. The conductive portion is electrically connected to the switch 714 in the center section of the steering wheel (e.g., 104 in FIG. 4).

Some embodiments, such as the one shown in FIG. 7A, include a wire lead 706 that is electrically connected between the horn 704 and the carbon-based contact 710. Those having ordinary skill in the art will realize that a wire lead 706 may be used with a non-conductive prong (a non-conductive prong would not appear on a circuit diagram). Alternatively, as shown in FIG. 7A, the wire lead 706 and a conductive prong 708 may be electrically connected in parallel.

The section designated at 714 represents a steering column that is electrically connected between the switch 712 and the chassis ground 716. The chassis ground 716 is electrically connected to the negative terminal of the battery 702 to complete the circuit 700.

Figure 7B:
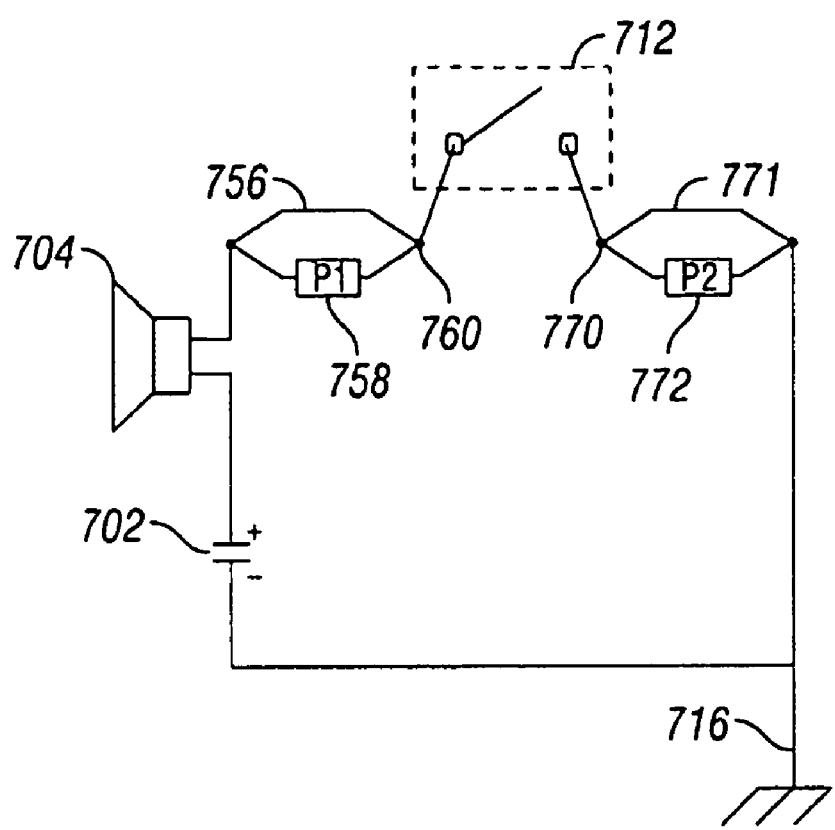
FIG. 7B shows a circuit diagram of a horn circuit in accordance with another embodiment of the invention.

FIG. 7B shows another embodiment of a horn circuit 750 in accordance with the invention. A battery 702 is electrically connected to a horn 704, and the horn is electrically connected to a switch 712 by a prong 758 and/or a wire lead 756. A carbon-based contact 760 is electrically connected to the prong 758 and the wire lead 756, and the carbon-based contact 760 is in electrical contact with a conductive portion on the steering wheel (not shown). The conductive portion is electrically connected to the switch 712. The circuit 750 does not include a steering column, as in FIG. 7A. In FIG. 7B, a a second carbon-based contact 770 is in electrical contact with a second conductive portion (not shown). A second prong 772 and/or a second wire lead 771 are electrically connected to the chassis ground 716, which may be electrically connected to the negative terminal of the battery 702.

As with the embodiment shown in FIG. 7A, the wire leads 756, 771 may be used in parallel with the prongs 758, 772, or they may be used independently of the prongs 758, 772. Additionally, some embodiments may not include wire leads 756, 771.

A carbon-based contact may comprise any carbon-based compound or carbon graphite compound known in the art. In one embodiment, the carbon based contact may comprise a CTI-22 type carbon compound, available from Morgan AM&T (St. Marys, Pa.). Additionally, a carbon-based contact in accordance is not limited to a cylindrical shape. For example, a carbon-based contact may comprise a brush as known in the art. Other shapes are possible.

Embodiments of the invention may present one or more of the following advantages. A carbon-based contact may enable a larger surface area to be in contact with a conductive portion on a steering wheel. The larger surface area will enable better electrical contact. Additionally, the larger surface area will decrease the tendency of the contact to gall, gauge, or score the steering wheel or conductive portion, thereby increasing the operating life of the horn circuit. Further, while the embodiment described refer to certain geometries for various components, those having ordinary skill in the art will appreciate that other geometries may be used without departing from the scope of the invention.

Advantageously, a carbon-based contact will not wear as easily as other materials, thus increasing the life of a horn circuit. The carbon-based contact may also provide a lower coefficient of friction with a steering wheel or a conductive portion. This will decrease the tendency of the contact to wear from the friction with the steering wheel or conductive portion.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A horn circuit for a vehicle, comprising:
   a steering wheel rotatable with respect to a steering column;
   a flexible prong extending from a base of the steering column, wherein the flexible prong includes a first end rigidly affixed to the base and a second free end; and
   a carbon-based contact disposed on the second free end of the flexible prong, wherein the carbon-based contact is in rotatable contact with a conductive portion of the steering wheel.

2. The horn circuit of claim 1, wherein the carbon-based contact comprises a CTI-22 carbon compound.

3. The horn circuit of claim 1, wherein the carbon-based contact is substantially cylindrical.

4. The horn circuit of claim 1, further comprising an electrical lead connected to the carbon-based contact and connected to the horn circuit.

5. The horn circuit of claim 1, wherein the base comprises a control assembly.

6. The horn circuit of claim 1, further comprising a center section of the steering wheel configured to close the horn circuit when the center section is depressed.

7. The horn circuit of claim 1, further comprising a second prong extending from the base of the steering column, and a second carbon-based contact positioned at an end of the second prong, wherein the second carbon-based contact is in contact with the conductive portion of the steering wheel.

8. The horn circuit of claim 1, further comprising a second prong extending from the base of the steering column, wherein the second prong includes and a second carbon-based contact positioned at its end in contact with a second conductive portion of the steering wheel.

9. A method of manufacturing a vehicular horn system, comprising:
   connecting a flexible prong to a base, wherein the flexible prong includes a first end rigidly affixed to the base and a second free end;
   connecting a steering wheel to a steering column that extends through the base, wherein the steering wheel is rotatable with respect to the steering column and the base; and
   positioning a carbon-based contact at an end of the second free end of the flexible prong to be in contact with the steering wheel.

10. The method of claim 9, further comprising positioning a conductive portion on an underside of the steering wheel, wherein the carbon-based contact is positioned to be in contact with the conductive portion.

11. The method of claim 10, further comprising:
   positioning a second conductive portion on the underside of the steering wheel;
   connecting a second prong to the base;
   positioning a second carbon-based contact at an end of the second prong to be in contact with the second conductive portion.

12. A horn circuit for a vehicle, comprising:
a steering wheel rotatable with respect to a steering column;
a conductive portion on the underside of the steering wheel;
a flexible prong having a first end rigidly affixed to a base and a second free end, wherein the steering wheel is rotatable with respect to the base; and
a carbon-based contact disposed on the second free end of the flexible prong and in contact with the conductive portion of the steering wheel.

13. The horn circuit of claim 12, wherein the base is positioned upon the steering column.

14. The horn circuit of claim 12, further comprising a center section of the steering wheel configured to close the horn circuit when the center section is depressed.

15. The horn circuit of claim 12, wherein the carbon-based contact is configured to maintain contact with the conductive portion of the steering wheel as the steering wheel is rotated.

16. The horn circuit of claim 12, further comprising:
a second prong affixed to the base; and
a second carbon-based contact disposed on the second prong and in contact with a second conductive portion of the steering wheel.

17. The horn circuit of claim 12, wherein the flexible prong is electrically conductive, and electricity conducts through the flexible prong, the carbon-based contact, and the conductive portion of the steering wheel when the horn circuit is closed.

18. The horn circuit of claim 1, wherein the flexible prong is electrically conductive, and electricity conducts through the flexible prong, the carbon-based contact, and the conductive portion of the steering wheel when the horn circuit is closed.

19. The method 10, further comprising conducting electricity through the flexible prong, the carbon-based contact, and the conductive portion of the steering wheel.

* * * * *